(No Model.)
M. FINKLESTEIN.
COOKER.
No. 520,305. Patented May 22, 1894.
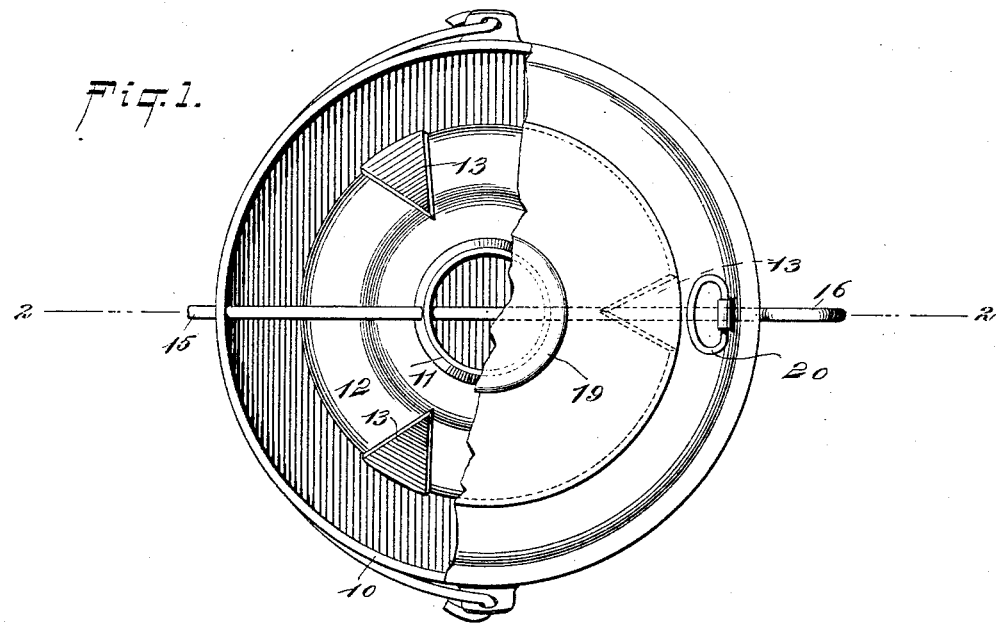
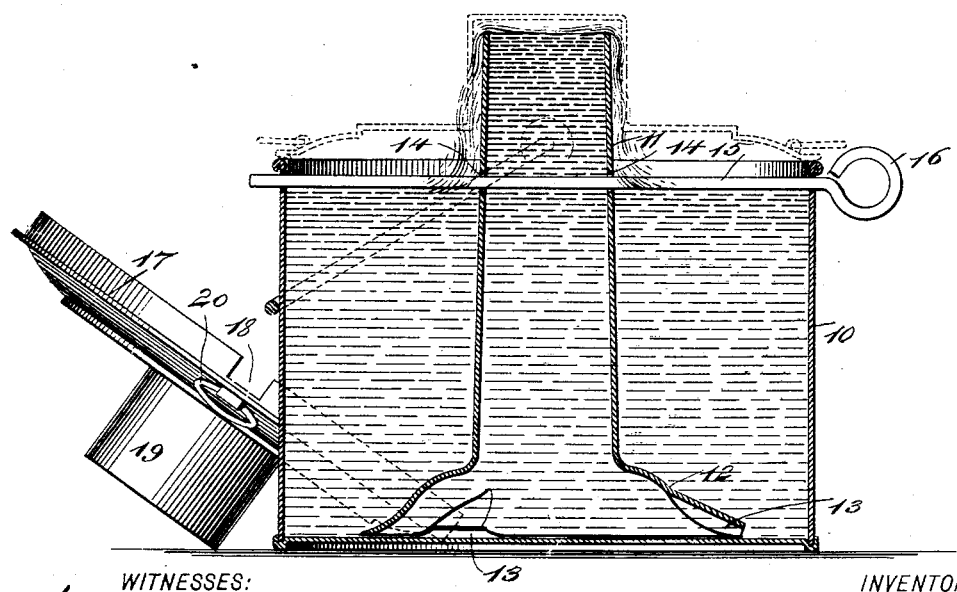
WITNESSES:
William Gaebel
C. Sedgwick
INVENTOR
M. Finklestein
BY
Munn & Co
ATTORNEYS.

UNITED STATES PATENT OFFICE.

MORIS FINKLESTEIN, OF NEW YORK, N. Y.

COOKER.

SPECIFICATION forming part of Letters Patent No. 520,305, dated May 22, 1894.

Application filed March 2, 1894. Serial No. 502,031. (No model.)

*To all whom it may concern:*

Be it known that I, MORIS FINKLESTEIN, of the city, county, and State of New York, have invented a new and Improved Cooker, of which the following is a full, clear, and exact description.

My invention relates to improvements in cookers; and the object of my invention is to produce a cheap and simple cooker, which is particularly adapted to cook milk or articles composed largely of milk, which is arranged in such a way that it may be used in connection with any kind of a fire or source of heat, and which is also adapted, while the material is being cooked, to keep it in circulation in such a manner that the milk is not turned even though it be cooked for a very long time and with an intense heat.

To these ends my invention consists of certain features of construction and combinations of parts, which will be hereinafter described and claimed.

Reference is to be had to the accompanying drawings, forming a part of this specification, in which similar figures of reference indicate corresponding parts in both the views.

Figure 1 is a broken plan view of the cooker embodying my improvement; and Fig. 2 is a vertical section on the line 2—2 of Fig. 1, but with the cover removed and placed at one side of the cooker.

The cooker is provided with a body 10 which is like an ordinary pail, having the usual bail, but the body may be a vessel of any approved kind. It is open at the top and, in connection with it is used the circulation tube 11 which is taller than the vessel or body 10 and which is open at both ends, the tube having its lower end expanded to form a substantial base 12 on which it may rest, and this base has circumferential ports 13 at its lower edge, these being formed preferably by pressing up or out the material composing the base, and these ports provide for the circulation of the milk or other liquid which is being cooked, as will appear below. The circulation tube 11 is perforated transversely at a point nearly opposite the upper edge of the vessel, these perforations 14 being adapted to receive a fastening pin 15 which projects transversely through the pail, being held in holes in the side thereof, as shown in Fig. 2, and for convenience the pin has one end turned up to form a handle 16. The holes 14 are rather higher than the holes in the pail, so that when the pin is inserted in the holes 14 it is necessary to press down slightly on the tube 11, thus expanding the base 12 and the reaction of this causes the tube to bind sufficiently on the pin to prevent any accidental displacement of the tube.

The cooker is provided with a suitable cover 17, which may be of any usual construction, except that its flange 18 is cut away so as to fit over the pin 15 and that it has an upwardly extending top 19 adapted to cover the top portion of the tube 11 so that the vessel 10 may be tightly sealed without the necessity of removing the circulation tube. For convenience the cover 17 is also preferably provided with rings 20 by which it may be handled or hung up.

When milk or milk containing liquid is to be cooked, the circulation tube is placed in the cooker, as shown, the cooker is filled with the liquid nearly to the top and is then placed on the fire or other source of heat. As the liquid is heated it rises in the tube 11, flows over the top of the tube and the heated liquid, which is projected upward through the tube, is of course displaced while the cooler liquid, flowing through the ports 13, takes its place and thus a constant circulation is maintained.

Having thus described my invention, I claim as new and desire to secure by Letters Patent—

The combination, with the open topped vessel having holes near the top, of the circulation tube within the vessel, provided with ports at the bottom and with holes to register with those in the vessel, and a fastening pin adapted to extend through the holes in the vessel and tube, substantially as described.

MORIS FINKLESTEIN.

Witnesses:
C. SEDGWICK,
F. W. HANAFORD.